Aug. 30, 1932.  E. W. SEAHOLM  1,874,366
CLUTCH
Filed May 17, 1929      2 Sheets-Sheet 1

Inventor
Ernest W. Seaholm
By Blakemore, Spencer & Flint
Attorneys

Aug. 30, 1932.  E. W. SEAHOLM  1,874,366
CLUTCH
Filed May 17, 1929   2 Sheets-Sheet 2

Inventor
Ernest W. Seaholm
By Blackmore, Spencer & Heib
Attorneys

Patented Aug. 30, 1932

1,874,366

UNITED STATES PATENT OFFICE

ERNEST W. SEAHOLM, OF BIRMINGHAM, MICHIGAN, ASSIGNOR TO GENERAL MOTORS CORPORATION, OF DETROIT, MICHIGAN, A CORPORATION OF DELAWARE

CLUTCH

Application filed May 17, 1929. Serial No. 363,905.

This invention relates to clutches and has been designed as an improvement in a known type of disc clutch wherein the clutch is engaged and released by the movement of driving members toward and from each other to effect and release the frictional grip of driven members between said driving members and an intermediate driving member.

An object of the invention is to improve the structure of the clutch and particularly the operating mechanism.

A further object is to avoid the effect of centrifugal force upon the operating levers or fingers.

Other objects and advantages will be understood from the following description and the accompanying drawings.

Figure 1:
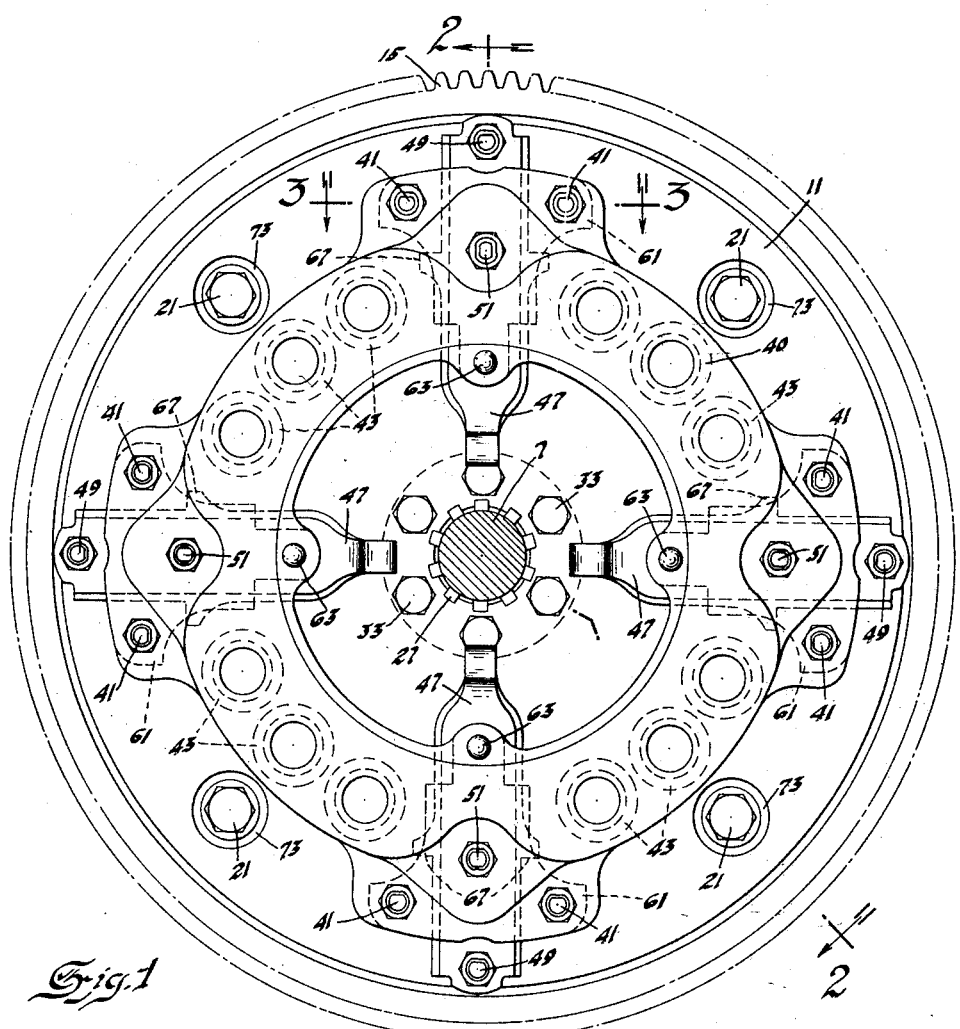
Fig. 1 is a clutch in elevation.

Referring by reference characters to the drawings, numeral 5 represents the driving shaft which, in the application of the invention to motor vehicles, will be driven by the engine. Numeral 7 represents the driven shaft, the rear end of which will be associated with any preferred transmission mechanism.

The shaft 7 may be rotatably mounted by anti-friction means 9 within a recess in the end of shaft 5. Numeral 11 represents a flywheel which as shown is hollow and which is secured to the flange on shaft 5 by fastening means 13. The flywheel 11 is provided with a ring gear 15 which is to be engaged by the driving pinion of a starting motor. As will be seen from the drawings, this ring gear is mounted on a flange 17 integral with the flywheel. At 19 is what will be designated as an intermediate driving plate. This plate is received in a recess of the flywheel as shown, is annular in form and is secured to the flywheel by a plurality of fastening means 21. As will be seen the outer periphery of this intermediate driving member 19 is somewhat spaced from the inner periphery of the flange 17. It is the purpose of this construction to permit the expansion of the ring 19 without distortion as might occur if it were fitted snugly into the flywheel recess. Numeral 23 represents one of a series of fulcrum bolts symmetrically distributed and secured by retaining means 25 to the intermediate plate 19. The drawings show a construction adapted for the use of four of such fulcrum bolts. The driven shaft 7 is shown provided with a splined portion 27 to which is secured a hub 29. On the opposite ends of the hub are secured driven plates 31 by suitable fastening means 33. At their outer peripheral portions the driven plates 31 are provided with annular friction rings 35.

Slidable on the fulcrum pins 23 are an inner driving clutch plate 37 and an outer driving clutch plate 39. These driving clutch plates 37 and 39 when moved toward each other grip the driven plates 31 between themselves and the intermediate plate 19. When in this gripping position, the drive is transmitted from driving shaft 5 through the driving clutch elements to the driven plates 31 and the driven shaft 7.

At 40 is a plate which may be designated the pressure plate. It is connected to the inner driving clutch plate 37 by a plurality of pairs of studs 41. These studs are formed with shoulders and cooperating nuts to hold the inner plate and the pressure plate in fixed positions relative to the studs. Of each pair one is arranged on each side of a fulcrum bolt.

Between the pressure plate and outer driving plate 39 there are arranged a plurality of coil springs 43. The metal of the pressure plate may be in-turned to form a channel for one end of the springs and preferably the outer driving plate is provided with cup-shaped elements 45 to receive the other ends of the springs. These springs operate in both directions. Their inward pressure upon the outer driving plate forces that plate toward the intermediate driving plate. The outward pressure of springs 43 pushes the pressure plate outwardly which through the instrumentality of studs 41 pulls the inner driving plate toward the intermediate driving plate. This construction neutralizes the tendency to end thrust in the clutch.

Figure 2:
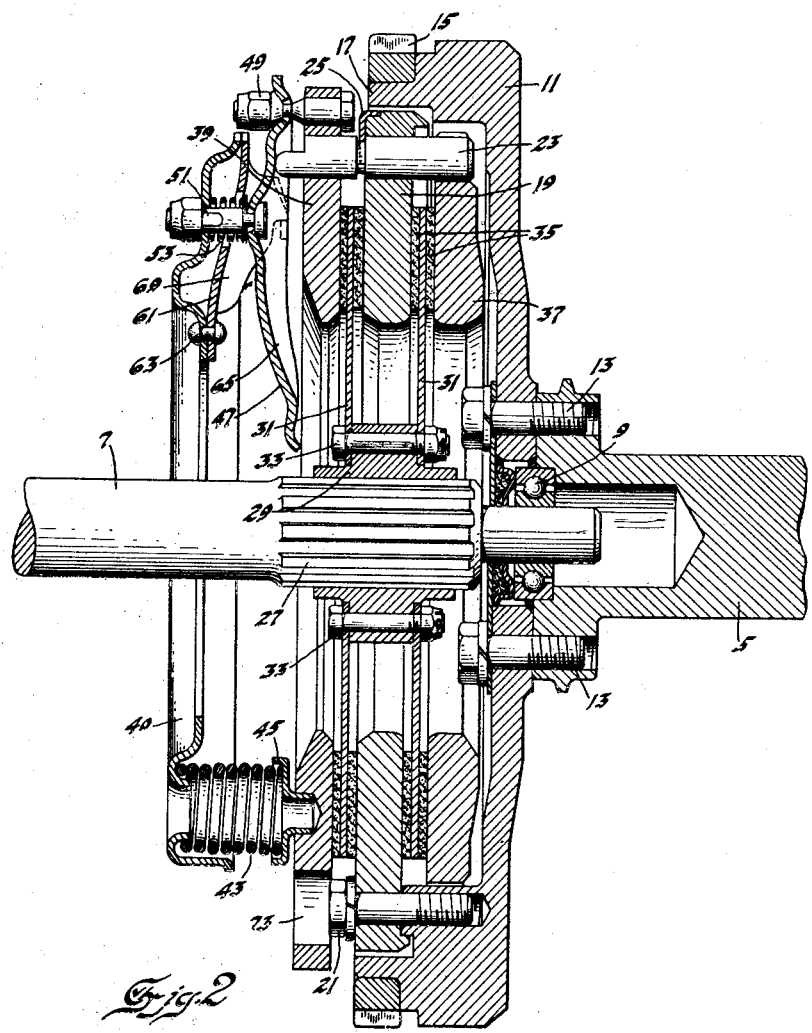
Fig. 2 is a section on line 2—2 of Fig. 1.

A plurality of levers or clutch throw-out fingers 47 extend radially and are located between the outer driving plate and the pressure plate. These fingers have a fulcrum engagement with the fulcrum pins 23 as shown in Fig. 2. Outwardly from their fulcrums the levers are formed with recesses and engage spherical surfaces on studs 49 carried by the outer driving plate 39. Inwardly from each of the fulcrums the levers 47 are oppositely recessed to engage spherical surfaces on studs 51 carried by the pressure plate 40. Suitable positioning springs 53 may be used between the pressure plate and the levers. In operation these levers function to release the clutch. Their inner ends are to be engaged and moved inwardly by any suitable clutch-releasing collar. No invention is being claimed for the collar and to simplify the illustration no collar is shown. As the lever rotates in a counter clockwise direction about its fulcrum the outer driving plate is moved away from the intermediate plate and the pressure plate, being pulled inwardly by means of stud 51 causes the movement of the inner driving plate away from the intermediate driving plate through the instrumentality of studs 41.

Figure 3:
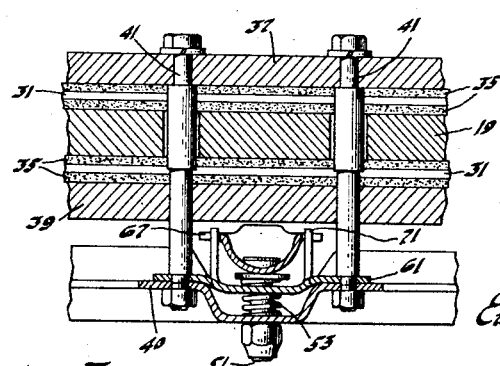
Fig. 3 is a view in section on line 3—3 of Fig. 1.

It has been found that there is a tendency under the influence of centrifugal force for the throw-out levers or fingers to move in an outward direction, and this force has been found to be of sufficient magnitude to require attention. Unless provision is made to restrain the levers from this movement the studs 49 must sustain this tendency of the levers to move outwardly. As a means for correcting this tendency, I provide brackets associated with each lever. These brackets are designated on the drawings by numeral 61. They may be secured to the pressure plate by rivets 63 at their inner ends and at their outer ends they may be secured by the studs 41 as shown in Fig. 3. The outer ends of the brackets will be received between the shoulders on the studs and the nuts as clearly illustrated. The levers 47 are shown as provided with flanges 65 which at a portion of their length are formed as outwardly directed lugs 67 as shown in Fig. 1. The brackets 61 are also formed with side flanges 69 which makes them of somewhat U-shape. These flanges are provided with inwardly directed extensions 71 which interengage with parts 67 of the levers. This bracket 61 is very inexpensive and may be made as a simple stamping. Through its engagement with the lever it effectively resists any tendency of the levers to move outwardly under the influence of the centrifugal force. To provide access to bolts 21 the outer driving plate may be provided with openings 73.

I claim:

1. In a clutch, an intermediate driving plate, inner and outer driving plates, one on each side thereof, a pressure plate spaced from the outer driving plate, means connecting said pressure plate and the inner driving plate, spring means between the pressure plate and the outer driving plate, said intermediate driving plate having fulcrum members, levers fulcrumed thereon and operatively connected to said pressure plate and outer driving plate, and brackets secured to said pressure plate, said brackets and levers having inter-engaging parts to restrain said levers from outward movement under the influence of centrifugal force.

2. In a clutch, a driving plate, a movable pressure plate, a lever operably connected to said plates to move said driving plate axially of said pressure plate, a U-shaped sheet metal bracket secured to said pressure plate, said bracket and said lever having inter-engaging parts independent of said operable connections to restrain said lever from movements influenced by centrifugal force.

3. In a clutch, a driving plate, a sheet metal movable pressure plate, a lever of U-shape in section operably connected to said plates to move said driving plate axially of said pressure plate, a U-shaped sheet metal bracket secured to one of said plates, said lever being assembled between the arms of the U-shaped bracket and said bracket and said lever having cooperating parts independent of said operable connections whereby said lever is restrained from movements influenced by centrifugal force.

In testimony whereof I affix my signature.

ERNEST W. SEAHOLM.